(12) United States Patent
Sugaya (10) Patent No.: US 9,462,620 B2
(45) Date of Patent: Oct. 4, 2016

(54) MOBILE TERMINAL, ACCESS POINT RELATED CONTENT PROVIDING SERVER, ACCESS POINT RELATED CONTENT ACQUIRING METHOD, MOBILE TERMINAL PROGRAM

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 71 days.

(21) Appl. No.: 14/472,577

(22) Filed: Aug. 29, 2014

(65) Prior Publication Data

US 2015/0312949 A1    Oct. 29, 2015

(30) Foreign Application Priority Data

Apr. 24, 2014  (JP) .................. 2014-090718

(51) Int. Cl.
*H04W 8/26* (2009.01)
*H04W 76/02* (2009.01)
*G06F 17/30* (2006.01)

(52) U.S. Cl.
CPC ...... *H04W 76/021* (2013.01); *G06F 17/30861* (2013.01); *H04W 8/26* (2013.01)

(58) Field of Classification Search
CPC ............... H04W 8/26; H04W 76/021; G06F 17/30861
See application file for complete search history.

(56) References Cited

U.S. PATENT DOCUMENTS

| | | | | |
|---|---|---|---|---|
| 2002/0091738 A1* | 7/2002 | Rohrabaugh | ......... | G06F 9/4443 715/249 |
| 2003/0120597 A1* | 6/2003 | Drummond | ............. | G06F 3/023 705/43 |
| 2011/0246910 A1* | 10/2011 | Moxley | ............. | G06F 17/30861 715/758 |
| 2014/0164560 A1* | 6/2014 | Ko | ........................... | H04L 67/02 709/217 |
| 2014/0177530 A1* | 6/2014 | Zhao | ...................... | H04W 12/06 370/328 |
| 2014/0189838 A1* | 7/2014 | Zhao | ...................... | H04W 12/06 726/7 |
| 2014/0229520 A1* | 8/2014 | Scott | ....................... | H04L 45/00 709/202 |
| 2014/0280468 A1* | 9/2014 | Duncan | ............... | H04L 67/2814 709/203 |
| 2014/0359740 A1* | 12/2014 | Yoon | ....................... | H04W 8/02 726/7 |
| 2015/0170072 A1* | 6/2015 | Grant | ................... | G06Q 10/067 705/7.36 |

FOREIGN PATENT DOCUMENTS

JP          2013073420          4/2013

* cited by examiner

*Primary Examiner* — Khaled Kassim
*Assistant Examiner* — Syed S Ali
(74) *Attorney, Agent, or Firm* — Lex IP Meister, PLLC (57) ABSTRACT

A content based on location information is provided to a mobile terminal. The mobile terminal 10 is communicatively connected to an access point related content providing server that includes a storage unit having an access point related content database 250 in which IP addresses and URLs of contents are associated with each other and are stored. The mobile terminal 10 performs a communication with a wireless access point to access a public network, acquires an IP address of the wireless access point, and transmits the acquired IP address to the access point related content providing server. The mobile terminal 10 receives an URL of a content that is associated with the transmitted IP address or location information identified by the transmitted IP address, and acquires the content designated by the received URL.

11 Claims, 8 Drawing Sheets

<ACCESS POINT RELATED CONTENT TABLE>

| AP_IP ADDRESS | CONTENT NAME | CONTENT URL | WEIGHT |
|---|---|---|---|
| 200.168.9.1% | SAGA MUSEUM OFFICIAL | http://www.saga-art.jp | 3 |
| 200.168.9.% | SAGA ST SHOP INFO | http://www.saga-st.jp | 2 |
| 149.88.19.YY | OUTLET OFFICIAL | http://www.youtlet.com | 1 |
| ... | ... | ... | ... |

FIG. 8

<CONTENT LOCATION TABLE>

| LOCATION INFO | CONTENT NAME | CONTENT URL | WEIGHT |
|---|---|---|---|
| (35.68,139.76) | SAGA MUSEUM OFFICIAL | http://www.saga-art.jp | 3 |
| (35.65,139.70) | SAGA ST SHOP INFO | http://www.saga-st.jp | 2 |
| (35.82,138.80) | OUTLET OFFICIAL | http://www.youtlet.com/sale.html | 1 |
| . . . | . . . | . . . | . . . |

MOBILE TERMINAL, ACCESS POINT RELATED CONTENT PROVIDING SERVER, ACCESS POINT RELATED CONTENT ACQUIRING METHOD, MOBILE TERMINAL PROGRAM

CROSS-REFERENCE TO RELATED APPLICATION

The present application claims priority to and the benefit of Japanese Patent Application No. 2014-090718 filed on Apr. 24, 2014, the entire contents of which are incorporated herein by reference.

BACKGROUND (a) Field

The present invention generally relates to a mobile terminal, an access point related content providing server, an access point related content acquiring method, and a mobile terminal program for providing location information based content.

(b) Description of the Related Art

In recent years, with spread of high-performance mobile terminals called smartphones or tablets, it is explosively increased to use contents as users move. Further, contents that users expect to browse in many places are increasing.

On the other hand, many of users are currently browsing web contents using search engines, and so-called pull-type content provision in which the users see what they want to see becomes the mainstream. However, in this case, a problem that precious contents do not provided to the users occurs.

To solve this problem, a recommendation system has been developed. The recommendation system performs a recommendation using the user's attributes without performing pre-registration for the user by using acquired face image of the user.

For example, Japanese Patent Publication No. 2013-073420 discloses that a mobile terminal acquires a user's face image and extracts a feature quantity from the acquired user's face image. Then, the mobile terminal transmits the extracted feature quantity to a recommendation server. The recommendation server receives the feature quantity from the mobile terminal, stores at least a plurality of feature quantities, performs matching processing of the received feature quantity with the stored feature quantities, recommends an application or the like on the basis of the matching result, and transmits the recommendation result to the mobile terminal. The mobile terminal receives the recommendation result from the recommendation server, and displays the received recommendation result.

However, since the recommendation is performed based on individual information such as the face in the above reference, it is impossible to perform the recommendation based on environment information such as location or time zone.

SUMMARY

An aspect of the present invention is directed to provide a mobile terminal, an access point related content providing server, an access point related content acquiring method, and a mobile terminal program for identifying a current location of a user from usage information of a GPS (Global Positioning System) or a public wireless LAN (Local Area Network) and then providing the user with a URL (Uniform Resource Locator) of a content that is associated with the identified location, thereby providing the user with the content according to the location information.

The present invention may provide the following aspects.

In a first aspect of the present invention, a mobile terminal communicatively connected to an access point related content providing server is provided. The mobile terminal includes an access point communication module configured to perform a communication with a wireless access point to access a public network, an IP address acquisition module configured to acquire an IP address of the wireless access point or an IP address of a router connected to the wireless access point, an IP address transmission module configured to transmit the acquired IP address to the access point related content providing server, an URL reception module configured to receive from the access point related content providing server an URL of a content that is associated with the transmitted IP address or location information identified by the transmitted IP address, and a content acquisition module configured to acquire the content designated by the received URL.

According to the first aspect of the present invention, a mobile terminal communicatively connected to an access point related content providing server can perform a communication with a wireless access point to access a public network, acquire an IP address of the wireless access point or an IP address of a router connected to the wireless access point, transmit the acquired IP address to the access point related content providing server, receive from the access point related content providing server an URL of a content that is associated with the transmitted IP address or location information identified by the transmitted IP address, and acquire the content designated by the received URL.

The first aspect of the present invention relates to the mobile terminal, but may be applicable to an access point related acquiring method and a mobile terminal program in the same manner.

In a second aspect of the present invention, an access point related content providing server communicatively connected to a mobile terminal is provided. The access point related content providing server has a storage unit including an access point related content database in which IP addresses of requestors and URLs of contents are associated with each other and are stored. The access point related content providing servers includes a requestor IP address reception module configured to receive from the mobile terminal an IP address of the wireless access point or a router to which the mobile terminal is connected, a related content extraction module configured to extract from the access point related content database an URL of a content that is associated with the received IP address and an access point related content providing module configured to provide the mobile terminal with the extracted URL.

According to the second aspect of the present invention, an access point related content providing server which is communicatively connected to a mobile terminal and has a storage unit including an access point related content database in which IP addresses of requestors and URLs of contents are associated with each other and are stored, can receive from the mobile terminal an IP address of the wireless access point or a router to which the mobile terminal is connected, extract from the access point related content database an URL of a content that is associated with the received IP address, and provide the mobile terminal with the extracted URL.

In a third aspect of the present invention, the access point related content providing server according to the second aspect of the present invention further has in the storage unit a location related content database in which location information of requestors and URLs of contents are associated with each other and are stored, and further includes a location information identification module configured to identify a location of the mobile terminal based on the received IP address, and a proximity content extraction module configured to extract from the location related content database an URL of a content that is associated with location information within a predetermined range from the identified location.

According to the third aspect of the present invention, the access point related content providing server according to the second aspect can have in the storage unit a location related content database in which location information of requestors and URLs of contents are associated with each other and are stored, identify a location of the mobile terminal based on the received IP address, and extract from the location related content database an URL of a content that is associated with location information within a predetermined range from the identified location.

In a fourth aspect of the present invention, a method of acquiring an access point related content is provided by a mobile terminal communicatively connected to an access point related content providing server. The method includes acquiring an IP address of a wireless access point or a router being used to access a public network, transmitting the acquired IP address to the access point related content providing server, receiving from the access point related content providing server an URL of a content that is associated with the transmitted IP address or location information identified by the transmitted IP address, and acquiring the content designated by the received URL.

In a fifth aspect of the present invention, a recording medium that stores a program for executing an access point related content acquiring method on a mobile terminal that is communicatively connected to an access point related content providing server is provided. The access point related content acquiring method includes acquiring an IP address of a wireless access point or a router being used to access a public network, transmitting the acquired IP address to the access point related content providing server, receiving from the access point related content providing server an URL of a content that is associated with the transmitted IP address or location information identified by the transmitted IP address, and acquiring the content designated by the received URL.

Aspects of the present invention can provide a mobile terminal, an access point related content providing server, an access point related content acquiring method, and a mobile terminal program for identifying a current location of a user from usage information of a GPS or a public wireless LAN and then providing the user with a URL of a content that is associated with the identified location, thereby providing the user with the content according to the location information.

DETAILED DESCRIPTION

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Overview of Access Point Related Content Providing System 1

Figure 1:
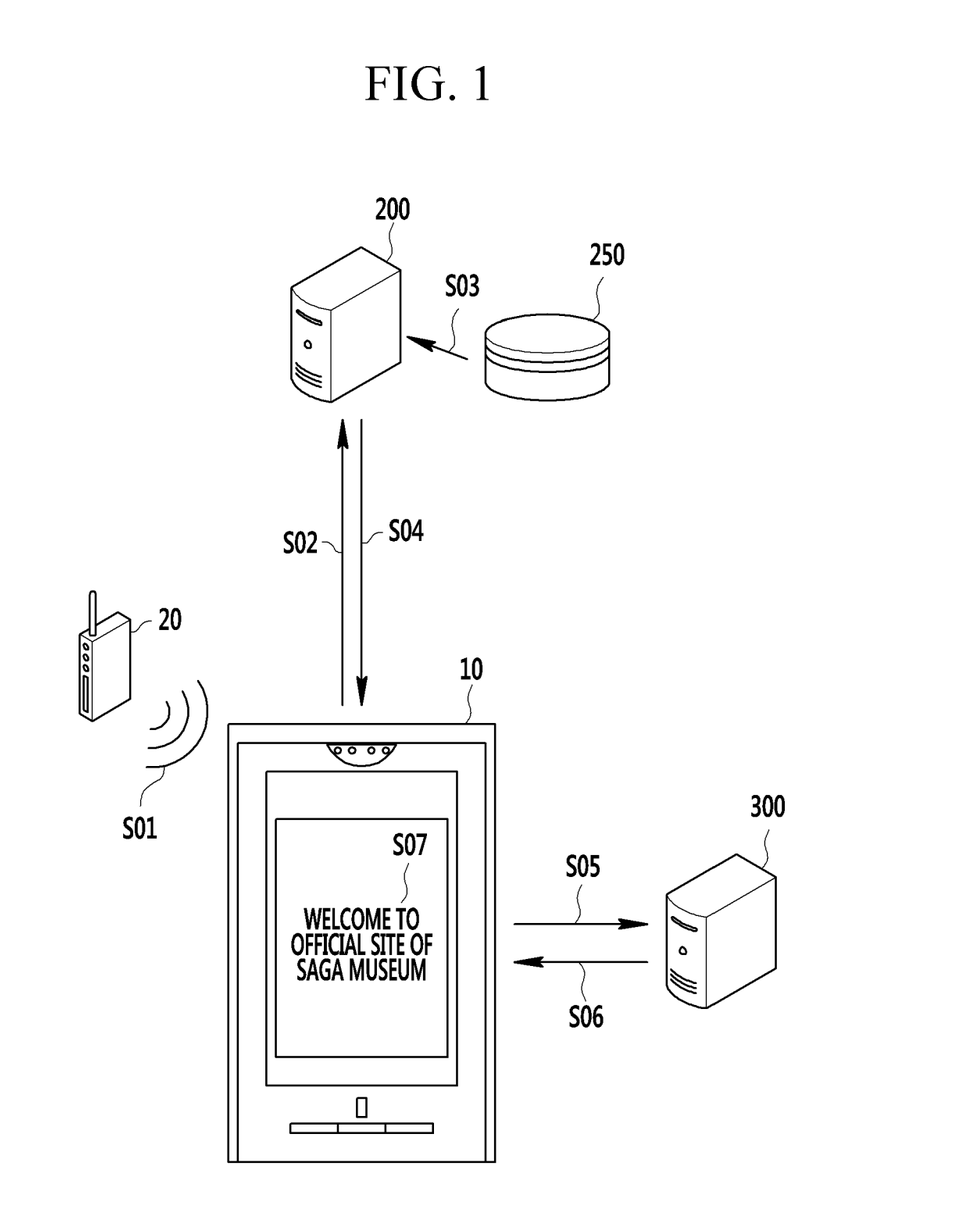
FIG. 1 is a diagram for explaining an overview of an access point related content providing system 1 according to an embodiment of the present invention.

FIG. 1 is a diagram for explaining an overview of an access point related content providing system 1 according to an embodiment of the present invention. The access point related content providing system 1 includes a mobile terminal 10, an access point related content providing server 200, and a web server 300.

In the access point related content providing system 1, the mobile terminal 10 connects to an access pint 20 to perform communication with a public network (Step S01). Simultaneously, the mobile terminal 10 acquires an IP (Internet Protocol) address of the access point 20. The IP address indicates a global IP address. In the case that the access point 20 is a relay and does not have the global IP address, the mobile terminal 10 acquires an IP address of a router to which the access point 20 is connected.

Next, the mobile terminal 10 transmits the acquired IP address to the access point related content providing server 200 (Step S02). The access point related content providing server 200 that has received the IP address extracts from an access point related content database 250 an URL (Uniform Resource Locator) of a content associated with the received IP address (Step S03).

The access point related content providing server 200 transmits the extracted URL to the mobile terminal 10 (Step S04). When a plurality of URLs have been extracted, the access point related content providing server 200 may select a URL with the largest weight from among the plurality of URLs with reference to weights predefined for the URLs.

On receiving the URL, the mobile terminal 10 transmits a request to the web server 300 based on the URL (Step S05). The web server 300 transmits to the mobile terminal 10 a web page, image(s), video(s), or application(s) in response to the request (Step S06). An application running in the mobile terminal 10 executes or plays the received data, thereby playing the content(s) on the mobile terminal 10 (Step S07).

Here, as a rule, the access point related content providing server 200 only provide the URL of the content, but does not provide the content itself. Accordingly, information about a relationship between the location information and contents stored in other servers can be provided as well as contents stored in the access point related content providing server 200 such that information to be handled can be increased.

As described above, the mobile terminal 10 can perform the connection to the access point 20, thereby receiving the content related to the current location of the URL without receiving any URL from the user. The above disclosure is the overview of the access point related content providing system 1.

System Configuration of Access Point Related Content Providing System 1

Figure 2:
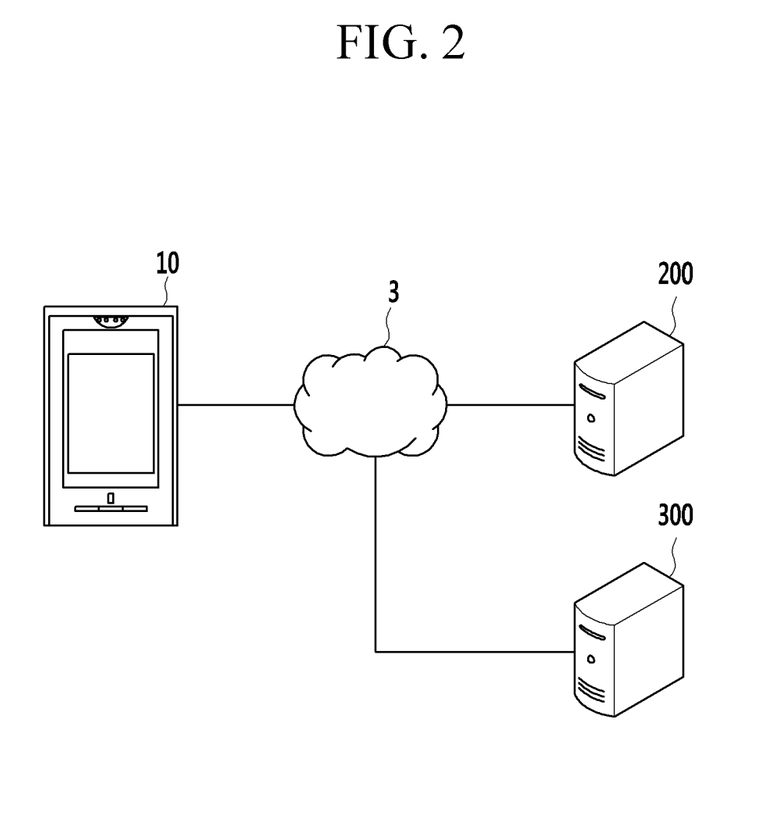
FIG. 2 is a system block diagram of an access point related content providing system 1 according to an embodiment of the present invention.

FIG. 2 is a system block diagram of an access point related content providing system 1 according to an embodiment of the present invention. The access point related content providing system 1 includes a mobile terminal 10, an access point related content providing server 200, a web server 300, and a public network 3 (for example, an internet network, or the third generation (3G) or fourth generation (4G) communication network).

The mobile terminal 10 has functions to be described below, and can perform data communication. The mobile terminal 10 is an electric appliance for home or commercial use that can be used while a user moves with carrying it. For example, the mobile terminal 10 may be a mobile phone, a portable information terminal, or a home information appliance such as a smartphone, a tablet terminal, a netbook terminal, a slate terminal, an electronic dictionary terminal, a portable music player, or the like.

The access point related content providing server 200 has functions to be described below, and may be a server for providing a URL of a content according to an IP address of an access point to which the mobile terminal 10 has attached.

The web server 300 may be a typical web server for providing a web content to the mobile terminal 10.

Description of Each Function

Figure 3:
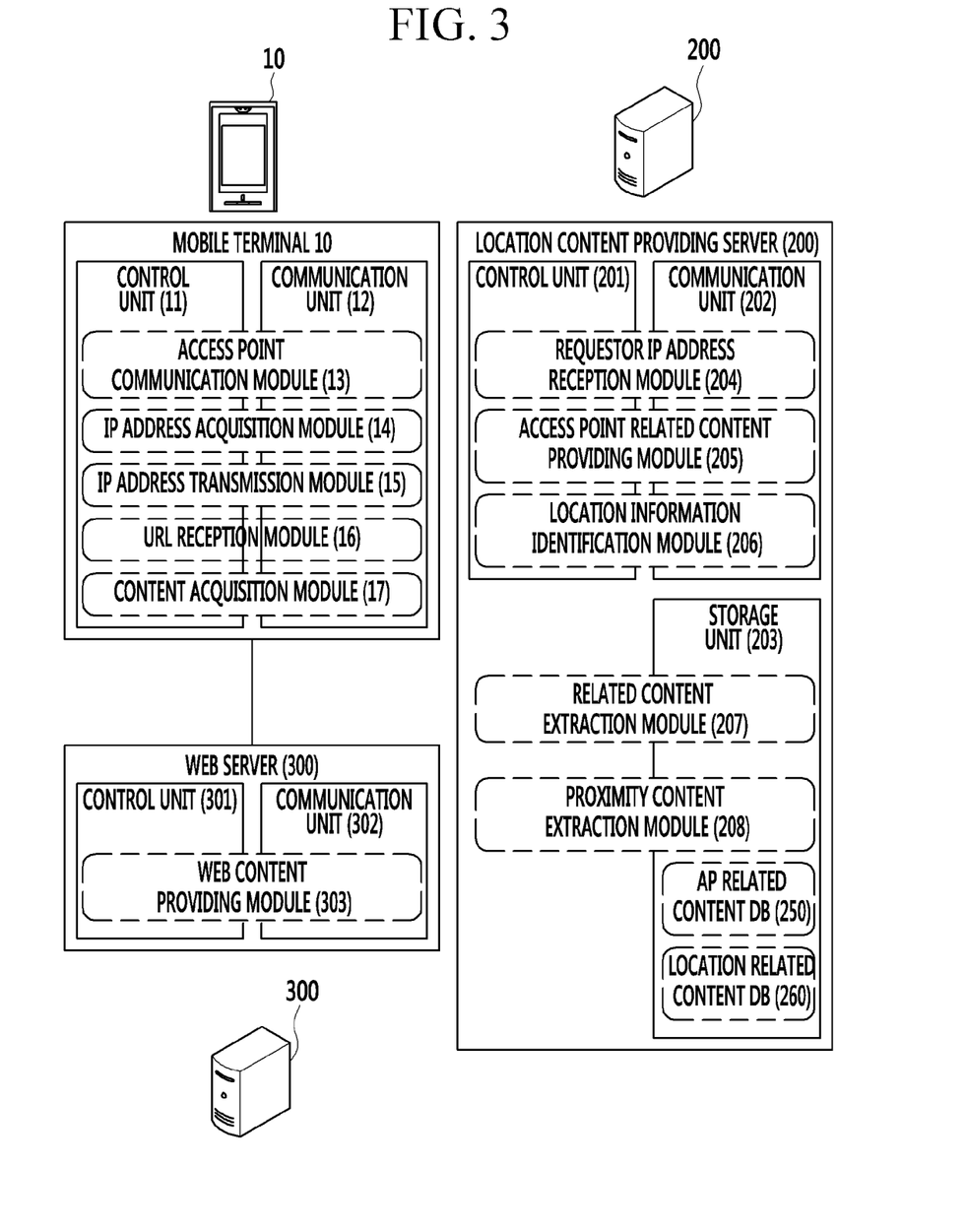
FIG. 3 is a function block diagram of a mobile terminal 10, an access point related content providing server 200, and a web server 300.

Configuration of each device is described with reference to FIG. 3.

The mobile terminal 10 includes a Central Processing Unit (CPU), a Random Access Memory (RAM), a Read Only Memory (ROM) and the like as a controller 11. The mobile terminal 10 further includes, as a communication unit 12, a device for enabling a communication with other device, for example a WiFi (Wireless Fidelity) enabled device based on IEEE 802.11.

In the mobile terminal 10, the control unit 11 reads a predetermined program, thereby realizing an access point communication module 13, an IP address acquisition module 14, an IP address transmission module 15, an URL reception module 16, and a content acquisition module 17, in cooperation with the communication unit 12.

Similarly to the mobile terminal 10, the access point related content providing server 200 includes a CPU, a RAM, a ROM and the like as a control unit 201. The access point related content providing server 200 further includes, as a communication unit 202, for example, a WiFi enabled device based on IEEE 802.11, or other appliance such as a device for enabling a connection by a wire cable, and a device for realizing a data communication with a wireless access point. Furthermore, the access point related content providing server 200 further includes, as a storage unit 203 for storing data and files, a data storage unit according to a hard disk, a semiconductor memory, a recording medium, or a memory card. The storage unit 203 includes an access point related content database 250 and a location related content database 251.

In the access point related content providing server 200, the control unit 201 reads a predetermined program, thereby realizing a requestor IP address reception module 204, an access point related content providing module 205, and a location information identification module 206, in cooperation with the communication unit 202. Further, in the access point related content providing server 200, the control unit 201 reads a predetermined program, thereby realizing a related content extraction module 207 and a proximity content extraction module 208 in cooperation with the storage unit 203.

Similarly to the mobile terminal 10, the web server 300 includes a CPU, a RAM, a ROM and the like as a control unit 301. The web server 300 further includes, as a communication unit 302, for example, a WiFi enabled device based on IEEE 802.11, or other appliance such as a device for enabling a connection by a wire cable, and a device for realizing a data communication with a wireless access point.

In the web server 300, the control unit 301 reads a predetermined program, thereby realizing a web content providing module 303 in cooperation with the communication unit 302.

Access Point Related Content Providing Process

Figure 4:
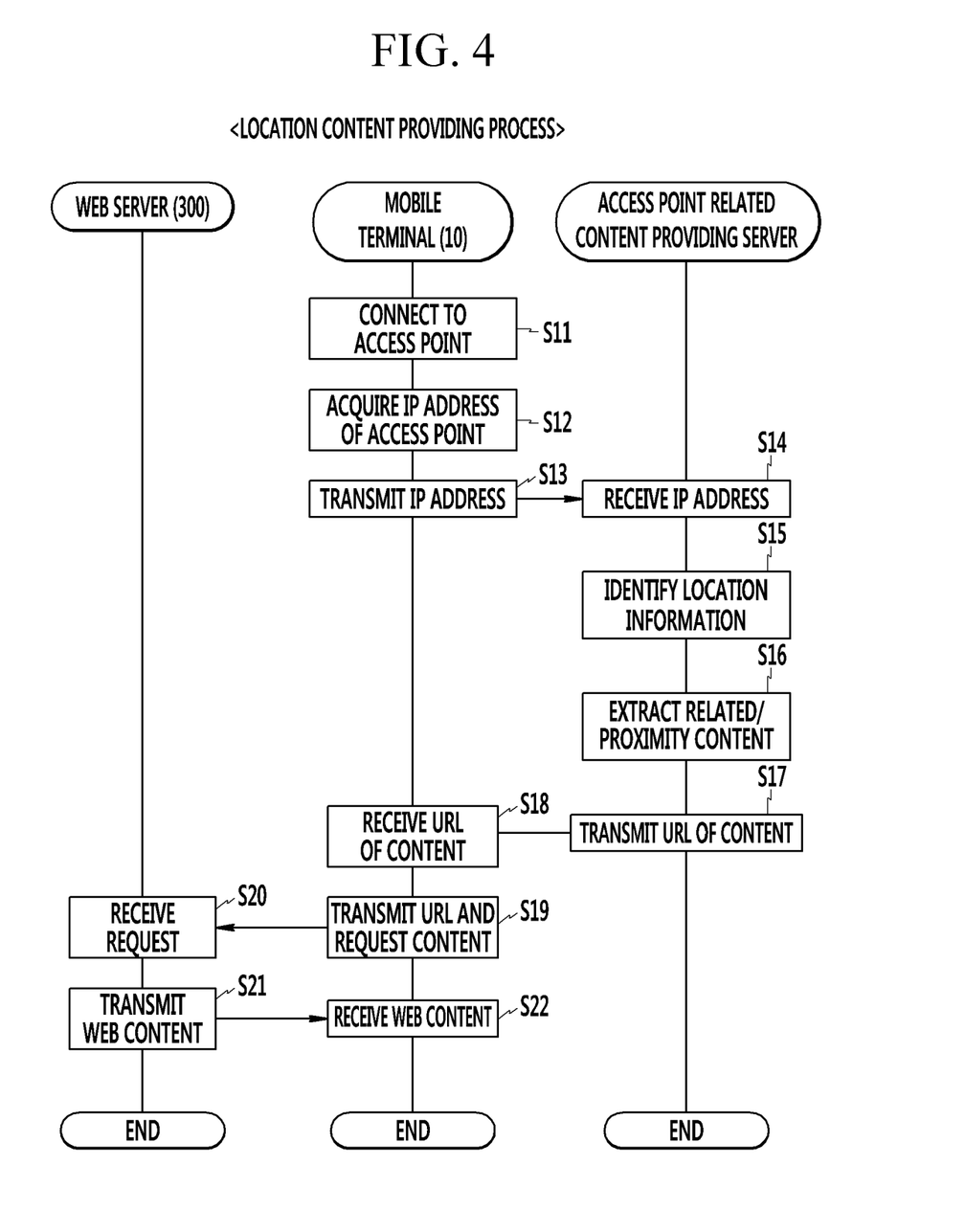
FIG. 4 is a flowchart of an access point related content providing process executed by a mobile terminal 10, an access point related content providing server 200, and a web server 300.

FIG. 4 is a flowchart of an access point related content providing process executed by a mobile terminal 10, an access point related content providing server 200, and a web server 300. Processes executed by the modules of each device described above are described in conjunction with the present procedure.

First, the access point communication module 13 of the mobile terminal 10 starts a communication with an access point (Step S11). Here, the access point is a device that performs a communication for accessing the public network via the wireless communication.

Next, the IP address acquisition module 14 of the mobile terminal 10 acquires an IP address of the access point to which the mobile terminal 10 is connected (Step S12). Here, the IP address indicates a global IP address not a private IP address. In the case that the access point does not have the global IP address, the mobile terminal 10 may acquire an IP address of a router to which the access point is connected.

Subsequently, the IP address transmission module 15 of the mobile terminal 10 transmits the acquired IP address to the access point related content providing server 200 (Step S13). The requestor IP address reception module 204 of the access point related content providing server 200 receives the IP address transmitted from the mobile terminal 10, i.e., a requestor (Step S14).

The location information identification module 206 of the access point related content providing server 200 identifies a current location of the mobile terminal 10 based on the received IP address (Step S15).

Next, the related content extraction module 207 of the access point related content providing server 200 extracts from the access point related content database 250 an URL of a content associated with the received IP address (Step S16).

Figure 7:
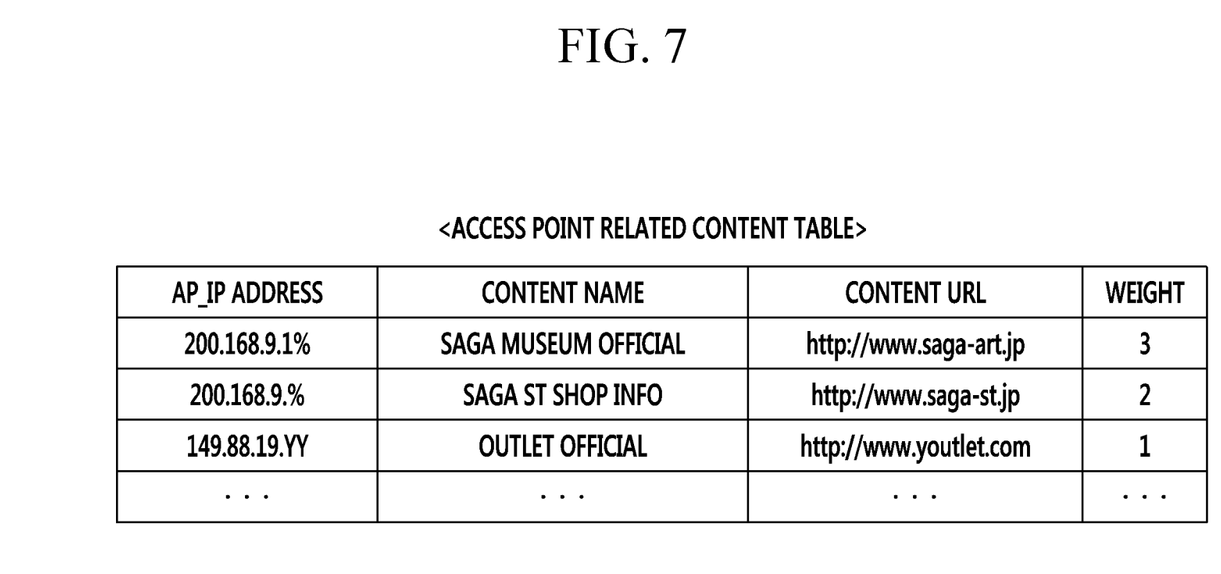
FIG. 7 shows an example of an access point related content table in an access point related content database 250.

FIG. 7 shows an example of an access point related content table in an access point related content database 250. In the access point related content table, IP addresses of access points, names of the contents, URLs of the contents, and weights of the contents are associated with each other and are stored.

Regarding the IP address, the IP address may be represented as a pattern by using a percent sign % indicating any of a plurality of numbers, like an example of "200.168.9.1%". For example, the IP address of "200.168.9.11", "200.168.9.151", or "200.168.9.1" may allocated to the IP address of "200.168.9.1%". When a plurality of contents are extracted at the extraction of the related content, a content with the largest weight may be extracted from among the plurality of contents with reference to the weights associated with the contents. Alternatively, a content having the highest conformity according to the pattern may be extracted.

Further, the proximity content extraction module 208 of the access point related content providing server 200 extracts from the location related content database 251 a content associated with location information that is within a predetermined range from the identified location information (Step S16).

Figure 8:
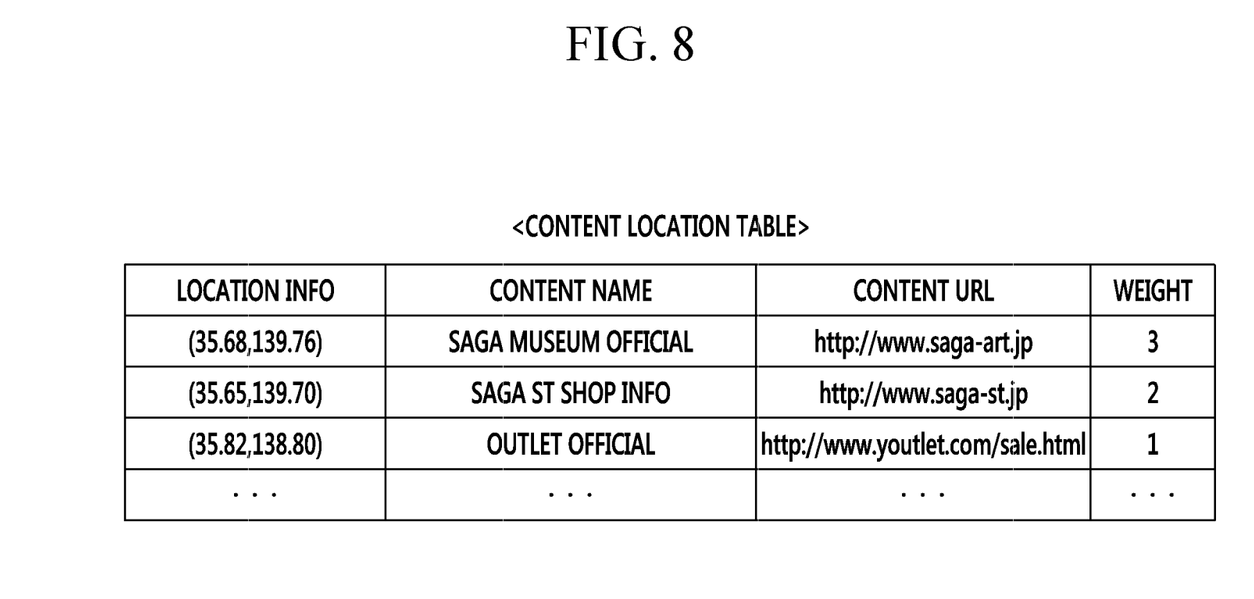
FIG. 8 shows an example of a location related content table in a location related content database 251.

FIG. 8 shows an example of a location related content table in a location related content database 251. In the location related content table, location information, URLs of the contents, and weights of the contents are associated with each other and are stored. Here, the location information is represented by latitude and longitude. Alternatively, the location information may be represented by a place name, a building name, or an identifier thereof.

The proximity content extraction module 208 of the access point related content providing server 200 extracts the location information that is within a predetermined range from the identified location information, and extracts from the location related content table the content that is associated with the extracted location information. When a plurality of contents are extracted, a content having the largest weight may be extracted with reference to the weights. Alternatively, a content having the shortest length from the identified location information may be extracted.

The access point related content providing module 205 of the access point related content providing server 200 transmits the URL of the extracted content to the mobile terminal 10 (Step S17).

The URL reception module 16 of the mobile terminal 10 receives the URL of the content (Step S18), the content acquisition module 17 transmits a request for the content to the web server 300 designated as an access destination by the URL (Step S19).

When receiving the request (Step S20), the web content providing module 303 of the web server 300 transmits a web page, an image, a video, or streaming corresponding to the request as a response (Step S21). The content acquisition module 17 of the mobile terminal 10 receives the web page, the image, the video, or the streaming (Step S22). The mobile terminal 10 may play or execute the received content. When the received content is an application, the mobile terminal 10 may automatically install the received application.

Figure 5:
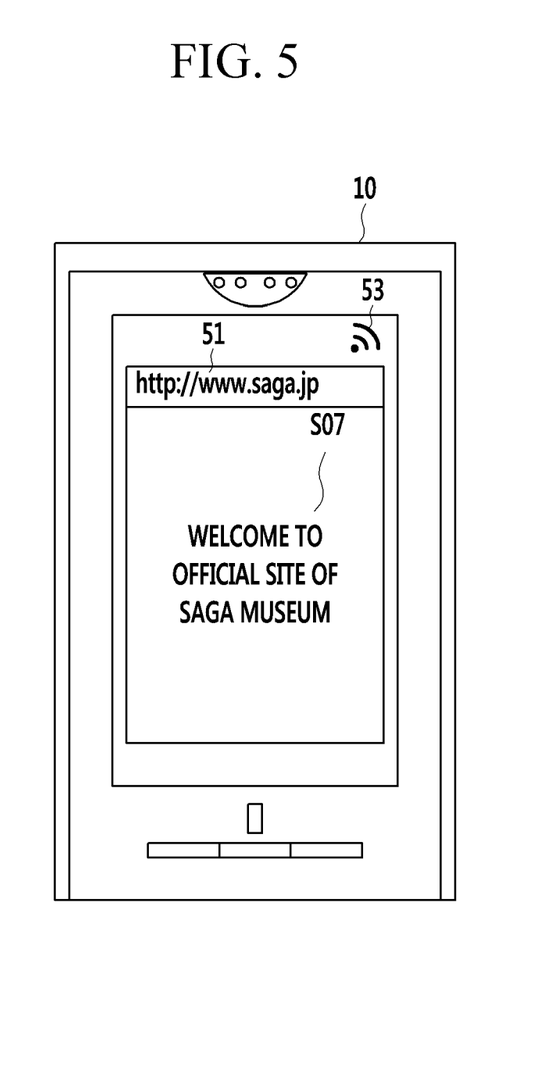
FIG. 5 shows an example of a display unit of a mobile terminal 10 displaying a received content.

FIG. 5 shows an example of a display unit of a mobile terminal 10 displaying a received content. In FIG. 5, the acquired URL is displayed in an address bar 51, and the received content is displayed in a window 52. A wireless communication icon 53 is displayed and indicates that the mobile terminal 10 is connected to a certain access point.

Figure 6:
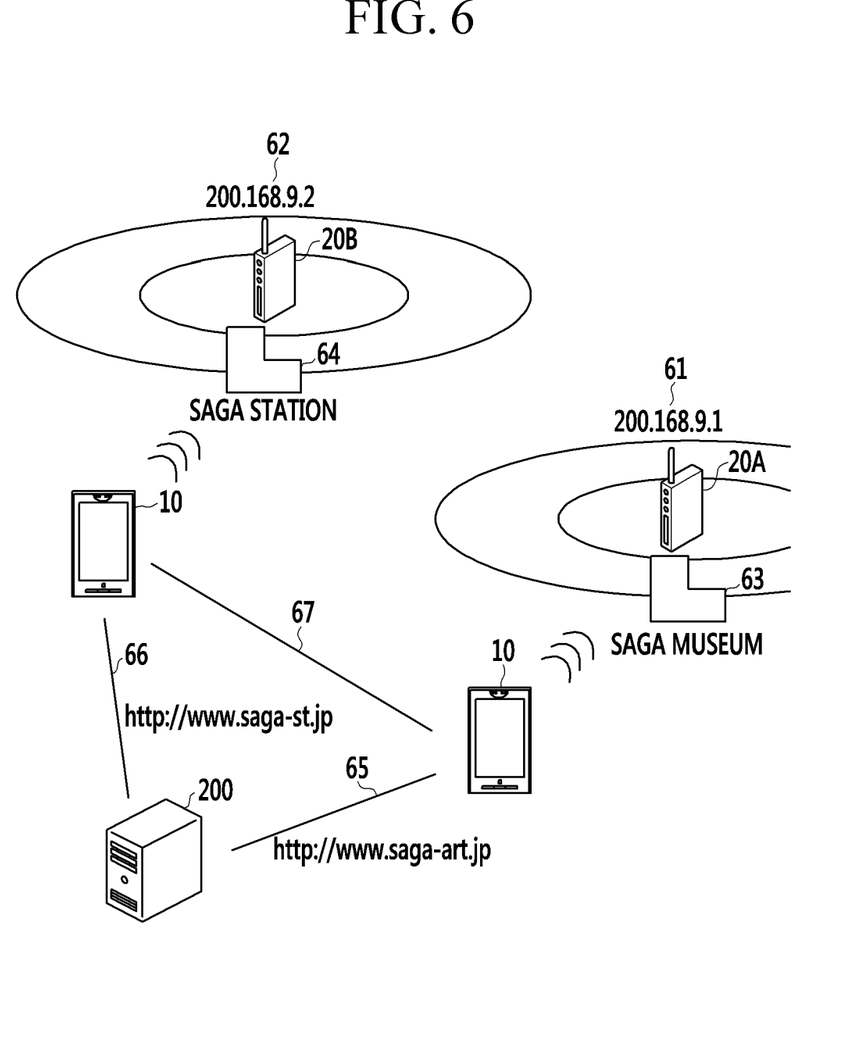
FIG. 6 is a schematic diagram showing a case that a mobile terminal 10 changes an access point to which it is connected.

FIG. 6 is a schematic diagram showing a case that a mobile terminal 10 changes an access point to which it is connected. In FIG. 6, IP addresses 61 and 62 are allocated to access points 20A and 20B, respectively, and the access points 20A and 20B are installed in buildings 63 and 64, respectively.

First, if the mobile terminal 10 connects to the access point 20A, the mobile terminal 10 receives a content 65 associated with the IP address 61 from the access point related content providing server 200 and displays the content 65. Next, if the mobile terminal 10 moves along a path 67 and connects to the access point 20B, the mobile terminal 10 receives a content 66 associated with the IP address 62 from the access point related content providing server 200 and displays the content 66. A resident application of the mobile terminal 10 may monitor these procedures.

The above disclosure is the procedure of the access point related content providing process executed by the mobile terminal 10, the access point related content providing server 200, and the web server 300.

The above-described means and functions are realized by reading and executing a predetermined program by a computer (including a CPU, an information processing apparatus, and various terminals). The program is recorded in a (non-transitory) computer-readable recording medium, for example, a flexible disk, a CD (e.g., a CD-ROM or the like) and a DVD (e.g., a DVD-ROM, a DVD-RAM, or the like). In this case, the program is read from the recording medium by a computer and transmitted to an internal storage unit or an external storage unit to be stored and executed. Further, the program may be pre-stored in a storage unit (recording medium) such as a magnetic disk, an optical disk, or an optical magnetic disk and transmitted from the recording medium to a computer through a communications line.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A mobile terminal communicatively connected to an access point related content providing server, the mobile terminal comprising:
   a controller configured to execute one or more modules comprising:
   an access point communication module configured to perform a communication with a wireless access point to access a public network;
   an IP (Internet Protocol) address acquisition module configured to acquire an IP address of the wireless access point or an IP address of a router connected to the wireless access point;
   an IP address transmission module configured to transmit the acquired IP address to the access point related content providing server;
   an URL (Uniform Resource Locator) reception module configured to receive from the access point related content providing server an URL of a content that is associated with the transmitted IP address or location information identified by the transmitted IP address; and
   a content acquisition module configured to acquire the content designated by the received URL,
   wherein the storing unit further includes a location related content database in which location information of requestors and URLs of contents are associated with each other and are stored,
   wherein the access point related content providing server further comprises:
   a location information identification module configured to identify a location of the mobile terminal based on the received IP address; and
   a proximity content extraction module configured to extract from the location related content database an URL of a content that is associated with location information within a predetermined range from the identified location, wherein proximity content extraction module extracts the location information that is within a predetermined range from the identified location information and extracts from the location related content table the content that is associated with the extracted location information, wherein a plurality of contents are extracted, a content having the largest weight may be extracted with reference to the weights.

2. The mobile terminal of claim 1, wherein, when the mobile terminal moves and connects to a second wireless access point, the URL reception module receives from the access point related content providing server a second URL of a second content that is associated with a second IP address of the second wireless access point or a second router connected to the second wireless access point, and the content acquisition module displays the second content designated by the second URL instead of the content.

3. The mobile terminal of claim 2, wherein the mobile terminal monitors movement of the mobile terminal to change the displayed content.

4. An access point related content providing server communicatively connected to a mobile terminal, the access point related content providing server comprising:
   a storage unit including an access point related content database in which IP addresses of requestors and URLs (Uniform Resource Locators) of contents are associated with each other and are stored; and
   a controller configured to execute one or more modules comprising:
      a requestor IP (Internet Protocol) address reception module configured to receive from the mobile terminal an IP address of the wireless access point or a router to which the mobile terminal is connected;
      a related content extraction module configured to extract from the access point related content database an URL of a content that is associated with the received IP address; and
   an access point related content providing module configured to provide the mobile terminal with the extracted URL,
   wherein the storing unit further includes a location related content database in which location information of requestors and URLs of contents are associated with each other and are stored,
   wherein the access point related content providing server further comprises:
   a location information identification module configured to identify a location of the mobile terminal based on the received IP address; and
   a proximity content extraction module configured to extract from the location related content database an URL of a content that is associated with location information within a predetermined range from the identified location,
   wherein proximity content extraction module extracts the location information that is within a predetermined range from the identified location information and extracts from the location related content table the content that is associated with the extracted location information,
   wherein a plurality of contents are extracted, a content having the largest weight may be extracted with reference to the weights.

5. The access point related content providing server of claim 4, wherein, when the mobile terminal moves and connects to a second wireless access point, the related content extraction module extracts from the access point related content database a second URL of a second content that is associated with a second IP address of the second wireless access point or a second router connected to the second wireless access point, and the access point related content providing module provides the mobile terminal with the second URL to allow the mobile terminal to display the second content designated by the second URL instead of the content.

6. A method of acquiring an access point related content by a mobile terminal communicatively connected to an access point related content providing server, the method comprising:
   acquiring an IP (Internet protocol) address of a wireless access point or a router being used to access a public network;
   transmitting the acquired IP address to the access point related content providing server;
   receiving from the access point related content providing server an URL (Uniform Resource Locator) of a content that is associated with the transmitted IP address or location information identified by the transmitted IP address; and
   acquiring the content designated by the received URL,
   wherein the storing unit further includes a location related content database in which location information of requestors and URLs of contents are associated with each other and are stored,
   wherein the access point related content providing server further comprises:
   a location information identification module configured to identify a location of the mobile terminal based on the received IP address; and
   a proximity content extraction module configured to extract from the location related content database an URL of a content that is associated with location information within a predetermined range from the identified location,
   wherein proximity content extraction module extracts the location information that is within a predetermined range from the identified location information and extracts from the location related content table the content that is associated with the extracted location information,
   wherein a plurality of contents are extracted, a content having the largest weight may be extracted with reference to the weights.

7. The method of claim 6, further comprising, when the mobile terminal moves and connects to a second wireless access point:
   receiving from the access point related content providing server a second URL of a second content that is associated with a second IP address of the second wireless access point or a second router connected to the second wireless access point; and
   displaying the second content designated by the second URL instead of the content.

8. The method of claim 7, further comprising monitoring movement of the mobile terminal to change the displayed content.

9. A non-transitory recording medium that stores a program for executing an access point related content acquiring method on a mobile terminal that is communicatively connected to an access point related content providing server, the access point related content acquiring method comprising:

acquiring an IP (Internet protocol) address of a wireless access point or a router being used to access a public network;

transmitting the acquired IP address to the access point related content providing server;

receiving from the access point related content providing server an URL (Uniform Resource Locator) of a content that is associated with the transmitted IP address or location information identified by the transmitted IP address; and acquiring the content designated by the received URL, wherein the storing unit further includes a location related content database in which location information of requestors and URLs of contents are associated with each other and are stored, wherein the access point related content providing server further comprises:

a location information identification module configured to identify a location of the mobile terminal based on the received IP address; and a proximity content extraction module configured to extract from the location related content database an URL of a content that is associated with location information within a predetermined range from the identified location, wherein proximity content extraction module extracts the location information that is within a predetermined range from the identified location information and extracts from the location related content table the content that is associated with the extracted location information, wherein a plurality of contents are extracted, a content having the largest weight may be extracted with reference to the weights.

10. The non-transitory recording medium of claim 9, wherein the access point related content acquiring method further comprises, when the mobile terminal moves and connects to a second wireless access point:

receiving from the access point related content providing server a second URL of a second content that is associated with a second IP address of the second wireless access point or a second router connected to the second wireless access point; and displaying the second content designated by the second URL instead of the content.

11. The non-transitory recording medium of claim 10, wherein the access point related content acquiring method further comprises monitoring movement of the mobile terminal to change the displayed content.

* * * * *